United States Patent

Hudson et al.

Patent Number: 5,423,897
Date of Patent: Jun. 13, 1995

[54] NON-BLOCKING WAX SEALANTS FOR FERTILIZERS

[76] Inventors: Alice P. Hudson, 728 W Kalmia Dr., Lake Park, Fla. 33403; Fred E. Woodward, 200 Churchill Rd., W. Palm Beach, Fla. 33404

[21] Appl. No.: 956,384

[22] Filed: Oct. 5, 1992

Related U.S. Application Data

[63] Continuation-in-part of Ser. No. 640,840, Dec. 20, 1990, abandoned.

[51] Int. Cl.$^6$ .......................... C05C 9/00; C05G 3/10
[52] U.S. Cl. ...................... 71/28; 71/64.07; 71/64.11; 71/64.13
[58] Field of Search ............... 71/28, 64.07, 64.11, 71/64.13, 204

[56] References Cited

U.S. PATENT DOCUMENTS 4,042,366  8/1977  Fersch et al. ............... 71/29

FOREIGN PATENT DOCUMENTS 5626797  3/1981  Japan ............... 71/64.07
121406  3/1991  Japan ............... 71/64.13

*Primary Examiner*—Ferris Lander

[57] ABSTRACT

Mixtures of 50 to 99 percent hydrocarbon waxes and 1 to 50 percent of hydrocarbon soluble surfactants chosen from the group consisting of (a) primary and secondary alkyl amines in which the alkyl groups contain 16 to 30 carbon atoms, and (b) fatty acid amides of primary alkyl amines and (c) fatty acid esters of alkanols in which the alkyl groups of the acids, amines and alkanols contain 16 to 30 carbon atoms, or mixtures thereof, provide sealant coatings for sulfur coated urea which are superior moisture barriers and are non-blocking and thus do not require the addition of clay or other fine particle materials.

9 Claims, No Drawings

NON-BLOCKING WAX SEALANTS FOR FERTILIZERS

This application is a continuation-in-part of patent application Ser. No. 07/640,840, filed Dec. 20, 1990, now abandoned.

BACKGROUND OF THE INVENTION

1. Field of the Invention

Urea granules or prills which have been coated with sulfur to slow the rate of dissolution of the urea in the soil when they are applied as a fertilizer can be coated with a sealant to further slow the release. This application relates to improved sealant compositions which provide superior moisture barrier properties and are non-blocking and thus do not require the addition of clay or other fine particle materials.

2. Description of the Prior Art

The process for sulfur coating of urea granules or prills was developed in 1968 by the Tennessee Valley Authority (TVA) in Muscle Shoals, Ala., as an economical system for reducing the rate of dissolution of urea particles when they are applied to the soil as fertilizer. U.S. Pat. No. 3,342,577 describes this sulfur coating process and also the sealant material that was necessary to fill in the holes that result naturally in the sulfur coating as it cools. The TVA process is also described in Sulphur Inst. J. 4(3) 2–6 (1968), ibid. 8(4) 2–5 (1972a) and ibid. 8(4) 6–8 (1972b). The TVA recommendation for the sealant now used by the majority of manufacturers of sulfur coated urea is a mixture of 30% polyethylene resin in 70% bright stock mineral oil.

The process is further described in *Sulfur Coating of Urea Treated with Atapulgite Clay*, Gullett, G. L.; Simons, C. L.; and Lee, R. G.; presented at the 198th American Chemical Society meeting in Miami Beach, Fla., in September 1989.

The requirement for a sealant for sulfur coated urea (SCU) has been documented by McClellan and Scheib (Sulphur Inst. J. 9(3/4) 8–12 (1973), and by Scheib and McClellan ibid. 12(1) 2–5 (1976).

U.S. Pat. No. 4,042,366 describes SCU coated with a wax in which a water soluble additive is embedded. The wax used on the SCU by itself without the additive particles produces fertilizer particles which are tacky and not free flowing; the water soluble additive mitigates the tack, in a manner similar to the clay which is used in the TVA process.

Japanese patent 56-69295 discloses polymer resins used over SCU which provide free flowing particles. The resins are viscous and high melting and must be applied from a solvent solution. The solvent is then removed, creating either severe environmental and safety problems or great expense to prevent the release of the solvents to the workplace or the environment.

A description of slow release urea and NPK fertilizers is given in Hort. Rev. 1 79–140 (1979).

Paraffin waxes have been used to produce relatively slow dissolving clathrate complexes with urea by processes which do not relate to coating urea prills, but instead involve a solution or dispersion of urea in paraffin, as described in U.S. Pat. No. 3,252,786.

Paraffin has not been used as a slow release coating for urea because of its lack of adhesion. Also paraffin has not been used as a sealant for SCU for the same reason and also because when the SCU prills or granules are handled in high speed bulk moving equipment wherein large amounts of product are moved by hopper car or by truck and off-loaded into storage bins, the coating is rubbed off or otherwise cracked or abraded.

The wax-oil sealants as described by TVA publications and currently being applied to SCU require the addition of a clay conditioning agent at levels nearly equal to that of the wax sealant to prevent caking and provide a free flowing product. A typical process may require 3% of the wax-oil sealant and 2% of the clay conditioning agent on the weight of the SCU, or 67% clay on the weight of the sealant. This requires large scale clay handling equipment in addition to the equipment necessary to apply the molten sulfur and wax sealant.

When the clay conditioned SCU is applied in the field by mechanical spreaders, the clay or wax-clay mixtures tend to be removed from the SCU particles by the abrasive action of the screw conveyors and the mechanical spreading wheel, resulting in a build-up of wax-clay on various parts of the machine and requiring frequent shut-downs for cleaning.

OBJECTS

It is an object of this invention to provide sealants for SCU which will act to give the SCU granules or prills high water insoluble nitrogen (WIN) values and thus provide urea prills or granules which will release the urea to the soil at a slow uniform rate over an extended period of time.

It is a further object of this invention to provide a sealant for SCU which can be readily applied to the SCU particles in a molten form, and provides a sealed SCU product which becomes non-blocking and free flowing on cooling to ambient temperature, and therefore does not require a large amount of clay or other conditioning agent and thus minimizes the build-up of deposits in the field application equipment.

It is a further object to provide a sealant composition which is applied in a solvent free process.

Other objects and further scope of applicability of the present invention will become apparent from the detailed descriptions given herein; it should be understood, however, that the detailed descriptions, while indicating preferred embodiments of the invention are given by way of illustration only, since various changes and modifications within the spirit and scope of the invention will become apparent from such descriptions.

SUMMARY OF THE INVENTION

We have discovered that urea prills or granules coated with sulfur in accordance with the methods developed by the TVA, and subsequently sealed with hydrocarbon wax-hydrocarbon wax soluble surfactant composites provide a non-blocking fertilizer or fertilizer component with a slow release rate of soluble nitrogen to the soil.

The wax-surfactant composites are prepared by mixing surfactants chosen from the group consisting of (a) primary and secondary alkyl amines in which the alkyl groups contain 16 to 30 carbon atoms, (b) fatty acid amides of primary alkyl amines and (c) fatty acid esters of alkanols in which the alkyl groups of the acids, amines and alkanols contain 16 to 30 carbon atoms, or mixtures thereof, with certain hydrocarbon waxes.

DESCRIPTION OF THE PREFERRED EMBODIMENTS

The hydrocarbon soluble surfactants are added to the waxes to provide at least three functions in the compositions; (1) they improve the spreading and adhesion of the wax to the sulfur coated urea particle, (2) they improve the moisture barrier properties of the wax, and (3) they form associated molecular structures at the surface of the wax to improve the anti-blocking properties. We have discovered a select group of surfactants capable of performing all three functions, and specifically surfactants which are chosen from the group consisting of (a) primary and secondary alkyl amines in which the alkyl groups contain 16 to 30 carbon atoms, and (b) fatty acid amides of primary alkyl amines and (c) fatty acid esters of alkanols in which the alkyl groups of the acids, amines and alkanols contain 16 to 30 carbon atoms, or mixtures thereof.

Examples of suitable amines include cetyl amine, stearyl amine, arachidyl amine, behenyl amine, dicetyl amine, distearyl amine, diarachidyl amine, dibehenyl amine, and mixtures thereof. Secondary amines are preferred, and di(hydrogenated tallow) amine, in which the hydrocarbon moieties are a mixture of essentially straight chain $C_{16}$ to $C_{18}$ alkyl groups is especially preferred.

Examples of suitable amides include cetyl stearamide, stearyl stearamide, stearyl erucamide, and erucyl erucamide. Esters included in this invention are ester waxes which are natural products and modified natural products. Examples include candililla wax, which is a mixture of 28-29% wax esters, 12-14% alcohols and sterols, 49-50% hydrocarbons, and 7-9% free acids; carnauba wax, which is a mixture of 85-85% wax esters, 3-3.5% free fatty acids, 2-3% alcohols, 2-3% lactides, 1.5-3% hydrocarbons, and 4-6% resins; and montan wax which is a mixture of 62-68% long-chain ($C_{24}$-$C_{30}$) esters, 22-26% long chain acids, and 7-15% long-chain alcohols, ketones and hydrocarbons. A preferred ester is a modified montan wax in which the free fatty acid content is reduced by reaction with a minor portion of ethylene glycol.

Secondary amines and ester waxes are preferred over amides. An especially preferred surfactant composition is a mixture of a secondary amine and an ester, in which the amine promotes spreading and adhesion, and the ester provides a non-blocking surface. Both of the surfactants improve the moisture barrier properties of the wax sealant.

The hydrocarbon wax materials are chosen from a. Petroleum or mineral waxes characterized by having a range of melting points from about 38° C. to about 80° C. They also contain varying amounts of oil, which is arbitrarily defined as that portion of the wax which is soluble in methyl ethyl ketone at 31.7° C. (ASTM method D721). They are produced from crude oils by a variety of refining methods. Their compositions and physical properties are a continuum and can only be defined specifically by the refining method used for isolating the wax from oil from a specific oil field.

The preferred petroleum waxes are characterized by having a drop melt point of 60° C. or higher; and by having an oil content of less than about 5%, preferably less than about 2% and most preferably less than about 0.5%; and by being essentially free of aromatic or cyclic hydrocarbons. They form larger more regular crystals when cooling form the melt, which gives them good moisture vapor barrier properties but also makes them brittle.

Examples of suitable petroleum waxes include microcrystalline waxes which typically have an oil content of 5 to 15%, slack waxes which typically have an oil content of 5 to 15%, scale waxes which typically have an oil content of 2 to 5%, paraffin waxes which typically have an oil content of 1 to 2%, and fully refined paraffin waxes which typically have an oil content of less than about 1%.

b. Synthetic waxes, including polyethylene waxes represented by a product called Gulftene C30+. This is a synthetic wax made by the polymerization of ethylene. It is a co-product of the process used to synthesize alpha olefins of mostly about 10 to 18 carbon atoms. The waxes useful in the sealants of this invention are the residues from removing most of the olefins up to about 28 carbons. A typical composition for this wax is described by the size of the hydrocarbon wax molecules and the position of the olefin moiety. Waxes useful in this invention have 3 to 20% $C_{24-28}$ hydrocarbons, 60 to 95% $C_{30-54}$ hydrocarbons, and 0 to 20% $C_{56}$ and higher hydrocarbons. They consist of 0.5 to 2% paraffins (with no unsaturation), 30-40% hydrocarbons with vinylidine double bonds, 8-12% hydrocarbons with internal double bonds, and 50-55% hydrocarbons with alpha double bonds. The drop melt point is about 68°-75° C.

Another suitable synthetic wax is Polywax 500 manufactured by Petrolite. It is a polyethylene with an average molecular weight of 500, a drop melt point of 86° C., and viscosity at 149° C. of 3 centipoise.

The waxes described above differ from polyethylenes such as the products produced by Allied Corporation and sold under the trade names A-$C_6$ and A-$C_{1702}$, for example. The hydrocarbon waxes of this invention have average molecular weights in the range of 400 to 600, and form large crystalline regions on melting and cooling. The polyethylenes as represented by A-C6 and A-C1702 have average molecular weights of about 2000 and 1600, drop melting points of 106° C. and 92° C. respectively, and are largely amorphous. They are produced by a substantially different manufacturing process.

Hydrocarbon wax materials as described in b are preferred. Wax materials represented by the composition of Gulftene C30+ is most preferred. The solid composite materials at room temperature have densities greater than about 0.915 g/cc.

Other minor adjuvants commonly added to wax barrier coatings, such as antioxidants and microbicides, which are known to those skilled in the art, may be advantageously incorporated into the compositions of this invention.

Another aspect of this invention is to the process for sealing SCU particles or other fertilizer particles with the compositions of this invention. The process is dependent on (1) the absence of volatile components in the compositions; (2) the tendency of the compositions to spread spontaneously on the surface of the fertilizer particles, and thus give a coating free of voids and pin holes; and (3) the relatively low viscosity of the molten compositions which allows them to be sprayed or otherwise metered onto the fertilizer particles.

The process in its essential part involves contacting the sealant compositions with the fertilizer particles at a temperature above the melting point of the sealant composition with sufficient agitation and time to allow for a uniform coating, and then cooling with continuous agitation to ambient temperature.

A preferred process is to place the SCU or other fertilizer particles in a pan granulator, rotating drum, or other suitable mixing device for solid particles, warm the particles to about 70° C. to 100° C. and preferably to about 78° to 88° C., and introduce the sealant composition either in the form of a spray or liquid stream, or in the form of small pellets or prills of about 0.5 to 2 mm in diameter which melt immediately on contacting the heated SCU granules. The sealed SCU is cooled in a rotating drum or in a fluid bed cooler, and becomes free flowing without the aid of a clay or other conditioning agent.

The compositions are characterized by being non-blocking as films on a substrate of sulfur at 42° C. when tested by the following method: A 10 g sample of SCU to which a sealant composition has been applied is placed in an aluminum dish, and a 100 g weight is placed on top of the urea sample. The weighted urea sample is placed in an oven at 42° C. After 30 minutes, the weighted sample is removed from the oven and allowed to equilibrate to room temperature. The weight is removed, and the degree to which the coated SCU particles adhere to each other is evaluated. SCU sealed with the compositions of this invention do not adhere to each other by this test and thus will remain free-flowing after storage in bags or in storage bins at 42° C.

To determine urea loss in contact with water, 10 g of the coated SCU to be tested and 90 g of distilled water are placed in a polyethylene bottle and swirled gently. The bottle is capped and allowed to stand undisturbed for 24 hours, at which time it is gently swirled again and the concentration of urea dissolved in the water is determined from the refractive index of the solution. The dissolved urea is determined again after 4 days and after 7 days. The results are reported as the percent of the urea originally contained in the coated sample that has dissolved in the water phase in the indicated time period.

The following examples are provided to illustrate the preferred composition, the preferred method of preparation, and comparative evaluations with prior art compositions. In these examples and throughout the remainder of this disclosure, all percentages are by weight based on the total weight of all components in the described compositions.

EXAMPLE 1

The following wax sealants were prepared by melting the components at 80°–90° C. and mixing:

| Surfactant | % of sealant composition | Wax | % of sealant composition |
| --- | --- | --- | --- |
| A. None | 0 | $C_{30+}$ alpha olefin | 100 |
| B. Di(hydrogenated tallow) amine | 10 | $C_{30+}$ alpha olefin | 90 |
| C. Montan wax | 5 | $C_{30+}$ alpha olefin | 95 |

Urea granules coated with 16% sulfur were sealed with these compositions by the following procedure: 3.5 parts of the molten sealant composition were added to 100 parts of the SCU granules which had been preheated to 75° C. The wax and the granules were stirred with low shear for 1 minute at 75° C., then allowed to cool to 45° C. with continued gentle stirring. Cooling was accomplished with an air stream at 25° C., and took from 1 to 5 minutes, depending on the velocity of the air stream.

The caking tendency and the urea release rate of the sealed granules were determined by the described procedures. The results are shown below:

| Composition | Caking tendency | % urea loss in 7 days |
| --- | --- | --- |
| A. | slight | 25 |
| B. | slight | 14 |
| C. | none | 21 |

Composition A, which does not contain a surfactant, produces a slightly tacky surface on the SCU, and has inferior barrier properties compared to B and C, the compositions containing the surface active components of this invention.

EXAMPLE 2

The following wax sealants were prepared by the method of Example 1:

| Surfactant | % of sealant composition | Wax | % of sealant composition |
| --- | --- | --- | --- |
| D. Candelilla wax | 5 | $C_{30+}$ alpha olefin | 95 |
| E. Carnauba wax | 5 | $C_{30+}$ alpha olefin | 95 |
| F. Di(hydrogenated tallow)amine<br>Montan wax | 2.5<br><br>2.5 | $C_{30+}$ alpha olefin | 95 |

Urea granules coated with 16% sulfur were sealed with these compositions by the procedure of Example 1, except that only 2 parts of the sealant composition were added to 100 parts of the SCU.

The caking tendency and the urea release rate of the sealed granules were determined by the described procedures. The results are shown below:

| Composition | Caking tendency | % urea loss in 7 days |
| --- | --- | --- |
| D. | slight | 27 |
| E. | very slight | 28 |
| F. | none | 18 |

These results show the good effects produced by the combination of an amine and an ester of this invention.

EXAMPLE 3

The following wax sealants were prepared by melting the components at 80°–90° C. and mixing:

| Surfactant | % of sealant composition | Wax | % of sealant composition |
| --- | --- | --- | --- |
| *G. none | 0 | Slack wax | 100 |
| H. Montan wax | 50 | Slack wax | 50 |
| I. Di(hydrogenated tallow)amine | 20 | Slack wax | 80 |
| J. Di(hydrogenated tallow)amine<br>Montan wax | 10<br><br>10 | Slack wax | 80 |

*It was necessary to add 67 parts of atapulgite clay per 100 parts of slack wax to prevent agglomeration of the sealed granules.

Urea granules coated with 16% sulfur were sealed with these compositions by the procedure described in Example 1. 3.5 parts of the sealant composition per 100 parts of the SCU granules were applied.

The caking tendency and the urea release rate of the sealed granules were determined by the described procedures. The results are shown below:

| Composition | Caking tendency | % urea loss in 7 days |
| --- | --- | --- |
| G. | Severe (before clay addition) | 39 |
| H. | None | 24 |
| I. | Slight | 24 |
| J. | Very slight | 32 |

This example shows that by adding the surfactants of this invention to slack wax, which by itself gives an extremely tacky surface and has poor release properties sealant compositions which produce free flowing particles with acceptable release rates can be produced.

EXAMPLE 4

The following wax sealants were prepared by melting the components at 80°–90° C. and mixing:

| Surfactant | % of sealant composition | Wax | % of sealant composition |
| --- | --- | --- | --- |
| K. Stearamide | 5 | $C_{30+}$ alpha olefin | 95 |
| L. Stearyl stearamide | 5 | $C_{30+}$ alpha olefin | 95 |
| M. Arachidyl-behenyl amine | 5 | $C_{30+}$ alpha olefin | 95 |
| N. Montan wax | 5 | Paraffin (mp 150F) | 95 |
| O. Di(hydrogenated tallow)amine | 5 | Paraffin (mp 150F) | 95 |
| P. Di(hydrogenated tallow)amine Montan wax | 2.5 2.5 | $C_{30+}$ alpha olefin | 95 |
| Q. None | 0 | $C_{30+}$ alpha olefin | 100 |
| R. None | 0 | Paraffin (mp 150F) | 100 |

Urea "mini-granules" coated with 12% sulfur were sealed with these compositions by the procedure described in Example 1. Two parts of the sealant composition per 100 parts of the SCU granules were applied.

The caking tendency and the urea release rate of the sealed granules were determined by the described procedures. The results are shown below:

| Composition | Caking tendency | % urea loss in 7 days |
| --- | --- | --- |
| K. | None | 52 |
| L. | None | 41 |
| M. | None | 34 |
| N | Moderate | 25 |
| O | Moderate | 18 |
| P. | None | 23 |
| Q. | Slight | 43 |
| R. | Severe | 19 |

The surfactants of L-P which are compositions of this invention show superior release properties to the surfactant in composition K, which is not a composition of this invention.

COMPARATIVE EXAMPLE 5

The TVA recommended composition was prepared by mixing 70 g of Shellflex 790, which is a hydrotreated solvent extracted paraffinic oil, equivalent to HVI-150 Britestock (sp. gr. 0.905, mw 600–650, viscosity 30–35 SSU at 100° C.) and 30 g of A-C6 polyethylene (drop point 106° C.). It was applied at 3% to SCU granules. The resulting particles were extremely tacky and required 2 g of diatomaceous earth to render them free flowing. The release rate of urea was 27% in 7 days.

COMPARATIVE EXAMPLE 6

U.S. Pat. No. 4,042,366 col. 8, 1.17–29 defines the properties of the organic coating materials used for the sealant compositions of that invention. These include

| Melting point | 55–85 C. |
| --- | --- |
| Needle penetration | |
| 25C | 10–30 |
| 43C | 75–150 |
| Viscosity, 99C, SUS | 50–125 |
| Oil content, % w/w | 0–10 |

The following waxes, which have the properties specified above, were applied to SCU and the tack and the release rate of the urea were determined. The properties, and the test results are shown below, and compared to results from the composition of Example 1B.

| | Bowax 845 | Victory Wax | 158N paraffin | Example 1B |
| --- | --- | --- | --- | --- |
| Melting point, °C. | 65 | 79 | 69 | 71 |
| Needle penetration | | | | |
| 25C | 25 | 26 | 17 | |
| 43C | NA | 130 | 45(38C) | |
| Viscosity, 99C, SUS | 85 | 85 | 51 | |
| Oil content, % w/w | NA | 2–3 | 0.8 | |
| Tack | extreme | extreme | extreme | none |
| % release in 7 days | 26 | 31 | 17 | 17 |

The waxes with the properties desired in U.S. Pat. No. 4,042,366 are unsuitable for the instant invention, since they produce fertilizer particles which are extremely tacky and in general have release rates which are too rapid.

The embodiments of the invention in which an exclusive property or privilege is claimed are defined as follow:

1. Slow release fertilizer particles comprising a central mass consisting essentially of urea surrounded by from about 10 to about 20 percent based on the weight of the sulfur coated particle, of sulfur to which is added from about 0.75 to about 10 percent based on the weight of the sulfur coated particle of a sealant composition having a melting point below about 105° C., said sealant composition comprising a homogeneous mixture of from about 1 to about 50 percent of a first component, said first component being at least one surface active material chosen from the group consisting of (a) primary and secondary alkyl amines in which the alkyl groups contain 16 to 30 carbon atoms, (b) fatty acid amides of primary alkyl amines, and (c) fatty acid esters of alkanols in which the alkyl groups of the acids, amines and alkanols contain about 16 to 30 carbon atoms; and a second component, said second component being from about 50 to 99 percent of at least one hydrocarbon wax chosen from the group consisting of (a) natural petroleum waxes having drop melting points between about 60° and 80° C., containing less than about 5% oil as determined by ASTM method D721, and essentially free of aromatic or cyclic structures; and (b) synthetic hydrocarbon waxes which melt between about 60° C. and 105° C., and have molecular weight between about 400 and 600.

2. The composition of claim 1 in which the said second component is a synthetic olefin mixture with an average molecular weight of greater than 400, and comprises essentially 0.5 to 2% paraffins, 30–40% hydrocarbons with vinylidine double bonds, 8–12% hydrocarbons with internal double bonds, and 50–55% hydrocarbons with alpha double bonds, and a drop melt point of about 68° to 75° C., and is obtained as a co-product still residue in the manufacture of $C_{10}$ to $C_{28}$ alpha olefins.

3. The composition of claim 2 in which the said first component comprises from about 2.5 to about 10 percent of the sealant and is a mixture of di(hydrogenated tallow)amine and modified montan wax in a weight ratio of about 1:1.

4. The composition of claim 2 in which the said first component comprises from about 2.5 to about 15 percent of the sealant and is di(hydrogenated tallow)amine.

5. The composition of claim 1 in which the said first component is a secondary amine.

6. The composition of claim 1 in which the said first component is montan wax or modified montan wax.

7. The composition of claim 1 in which the said first component is a mixture of from about 20 to 80 parts of a secondary amine and from about 80 to 20 parts of montan wax or modified montan wax.

8. A process for producing a free-flowing slow release particulate fertilizer which comprises the steps of:
   A. providing a quantity of sulfur coated urea particles at a temperature above the melting point of the sealant composition;
   B. adding to said sulfur coated urea particles a sealant composition having a melting point below about 105° C., and consisting essentially of a homogeneous mixture of first and second components,
      said first component constituting about 1 to about 50 percent by weight of said composition and consisting essentially of at least one surface active material selected from the group consisting of (1) primary and secondary alkyl amines in which the alkyl groups contain from about 16 to 30 carbon atoms, (2) about 16 to 30 carbon fatty acid amides of about 16 to 30 carbon primary alkyl amines and (3) about 16 to 30 carbon fatty acid esters of about 16 to 30 carbon alkanols,
      said second component constituting about 50 to 99 percent by weight of said sealant composition and consisting essentially of at least one hydrocarbon wax chosen from the group consisting of (1) natural petroleum waxes having drop melting points between about 60° and 80° C., containing less than about 5% oil as determined by ASTM method D721, and essentially free of aromatic or cyclic structures, and (2) synthetic hydrocarbon waxes which melt between about 60° C. and 105° C., and have molecular weight between about 400 and 600;
   C. agitating the mixture of said sealant composition and fertilizer particles such that a continuous gentle mixing is achieved; and
   D. cooling the mixture with continuous agitation to a temperature below the melting point of the sealant composition.

9. Slow release fertilizer particles prepared by the process which comprises the steps of:
   A. providing a quantity of sulfur coated urea particles at a temperature above the melting point of the sealant composition;
   B. adding to said sulfur coated urea particles a sealant composition having a melting point below about 105° C., and consisting essentially of a homogeneous mixture of first and second components,
      said first component constituting about 1 to about 50 percent by weight of said composition and consisting essentially of at least one surface active material selected from the group consisting of (1) primary and secondary alkyl amines in which the alkyl groups contain from about 16 to 30 carbon atoms, (2) about 16 to 30 carbon fatty acid amides of about 16 to 30 carbon primary alkyl amines and (3) about 16 to 30 carbon fatty acid esters of about 16 to 30 carbon alkanols,
      said second component constituting about 50 to 99 percent by weight of said sealant composition and consisting essentially of at least one hydrocarbon wax chosen from the group consisting of (1) natural petroleum waxes having drop melting points between about 60° and 80° C., containing less than about 5% oil as determined by ASTM method D721, and essentially free of aromatic or cyclic structures, and (2) synthetic hydrocarbon waxes which melt between about 60° C. and 105° C., and have molecular weight between about 400 and 600;
   C. agitating the mixture of said sealant composition and fertilizer particles such that a continuous gentle mixing is achieved; and
   D. cooling the mixture with continuous agitation to a temperature below the melting point of the sealant composition.

* * * * *